United States Patent [19]

Sharples

[11] 4,085,952
[45] Apr. 25, 1978

BEST AVAILABLE COPY

[54] FLEXIBLE STEM VALVE

[75] Inventor: Thomas D. Sharples, Atherton, Calif.

[73] Assignee: Beckman Instruments, Inc., Fullerton, Calif.

[21] Appl. No.: 599,360

[22] Filed: Jul. 28, 1975

Related U.S. Application Data

[63] Continuation of Ser. No. 467,278, May 6, 1974, abandoned.

[51] Int. Cl.² ............................. F16K 11/00; F16K 5/00
[52] U.S. Cl. .............................. 251/298; 251/335 A; 251/261; 137/625.44; 137/872
[58] Field of Search .............. 137/625.4, 625.44, 625.46, 137/610, 636.4, 375; 251/298, 335 A, 303, 257, 304, 314, 315

[56] References Cited

U.S. PATENT DOCUMENTS

| | | | |
|---|---|---|---|
| 1,171,189 | 2/1916 | Grandi | 251/298 |
| 2,855,000 | 10/1959 | Van Allen et al. | 137/625.43 |
| 2,912,012 | 11/1959 | Klingler | 251/303 X |
| 2,928,421 | 3/1960 | Nordstrand | 251/261 X |
| 3,064,941 | 11/1962 | Stromberg | 251/260 |
| 3,176,720 | 4/1965 | Donahue | 137/625.44 |
| 3,498,319 | 3/1970 | Schnabel | 137/375 |
| 3,949,965 | 4/1976 | Sharples | 251/315 |

FOREIGN PATENT DOCUMENTS 864 9/1898 Austria .................... 251/298

*Primary Examiner*—William R. Cline
*Attorney, Agent, or Firm*—Robert J. Steinmeyer; Ferd L. Mehlhoff; William H. May

[57] ABSTRACT

A valve construction in the form of a "flex-finger" or flexible stem valve is provided for handling substances which are highly corrosive or very active chemically. The valve body, valve seats, a valve ball and flexible finger or flexible valve stem are all composed of chemically resistant material. The flexible stem has an outer end secured in the valve body against rotation with a fluid tight joint and an inner end for actuating the "ball". The flexible stem is composed of material which is sufficiently resilient so that it may be caused to travel in a circular or orbital path carrying or actuating a "ball" or other attachment into and out of engagement with the valve seat or seats. For causing such motion the flex stem is made hollow but with the lower end closed to prevent entry of fluid from a valve port, and a bent operating rod is mounted within the hollow space in the flexible stem with a slip fit so that rotation of the outer end of the bent operating rod serves to cause orbital movement of the inner end of the flexible finger without twisting or rotation thereof.

10 Claims, 12 Drawing Figures

BEST AVAILABLE COPY

BEST AVAILABLE COPY

BEST AVAILABLE COPY

FLEXIBLE STEM VALVE

This is a continuation of application Ser. No. 467,278 filed May 6, 1974, now abandoned.

BACKGROUND OF THE INVENTION

In the synthesis of certain substances and for other purposes it becomes necessary to control the flow of gas or liquid which may be corrosive or very reactive chemically. Heretofore, both gas and liquid valving for such process chemicals has presented very difficult problems. Valves have been proposed which attempt to isolate the operating mechanism from the process chemicals by means of flexible diaphragms or by stuffing box type glands. The latter type always have some tendency to leak and the high friction associated with them leads to problems in obtaining reliable operation. The diaphragm type seals are subject to accidental piercing and are subject to a measurably high rate of permeation by both organic solvents and acid vapors which rather quickly lead to undependable operation of the valve actuating mechanism. Bellows types of seals composed of flexible materials have also presented the problems of diaphragm type seals.

It is accordingly an object of the invention to overcome problems which have heretofore existed, to provide reliable valving of process chemicals and to provide durable valves for corrosive and chemically reactive substances which may be operated easily, manually or automatically.

Other and further objects, features and advantages of the invention will become apparent as the description proceeds.

SUMMARY OF THE INVENTION

In carrying out the invention in accordance with a preferred form thereof a valve body is provided having a chamber therein wholly enclosed except for openings for ports and an opening for receiving a flexible finger or flexible stem. The flexible stem has an outer end with a collar secured against rotation in the opening in the valve body and sealed to the valve body to prevent leakage. The flexible stem is hollow in order to receive a bent operating rod having a shank or straight portion rotatable coaxially with the valve body opening for the stem. The stem has its lower end closed thereby preventing entry of any fluid into the hollow interior thereof. At the lower end of the flexible stem is a valve closure member referred to for convenience as a valve "ball" which is caused to travel in a circular or orbital path by the rotation of the operating rod about its axis.

One or more peripheral openings with ports and valve seats are provided around the orbital path of the valve "ball" so that it becomes engaged or disengaged with each valve seat as it travels in its orbital path.

A better understanding of the invention will be afforded by the following detailed description considered in conjunction with the accompanying drawings.

DRAWINGS

In the drawings

Like reference characters are utilized throughout the drawings to designate like parts.

DETAILED DESCRIPTION

Figure 1:
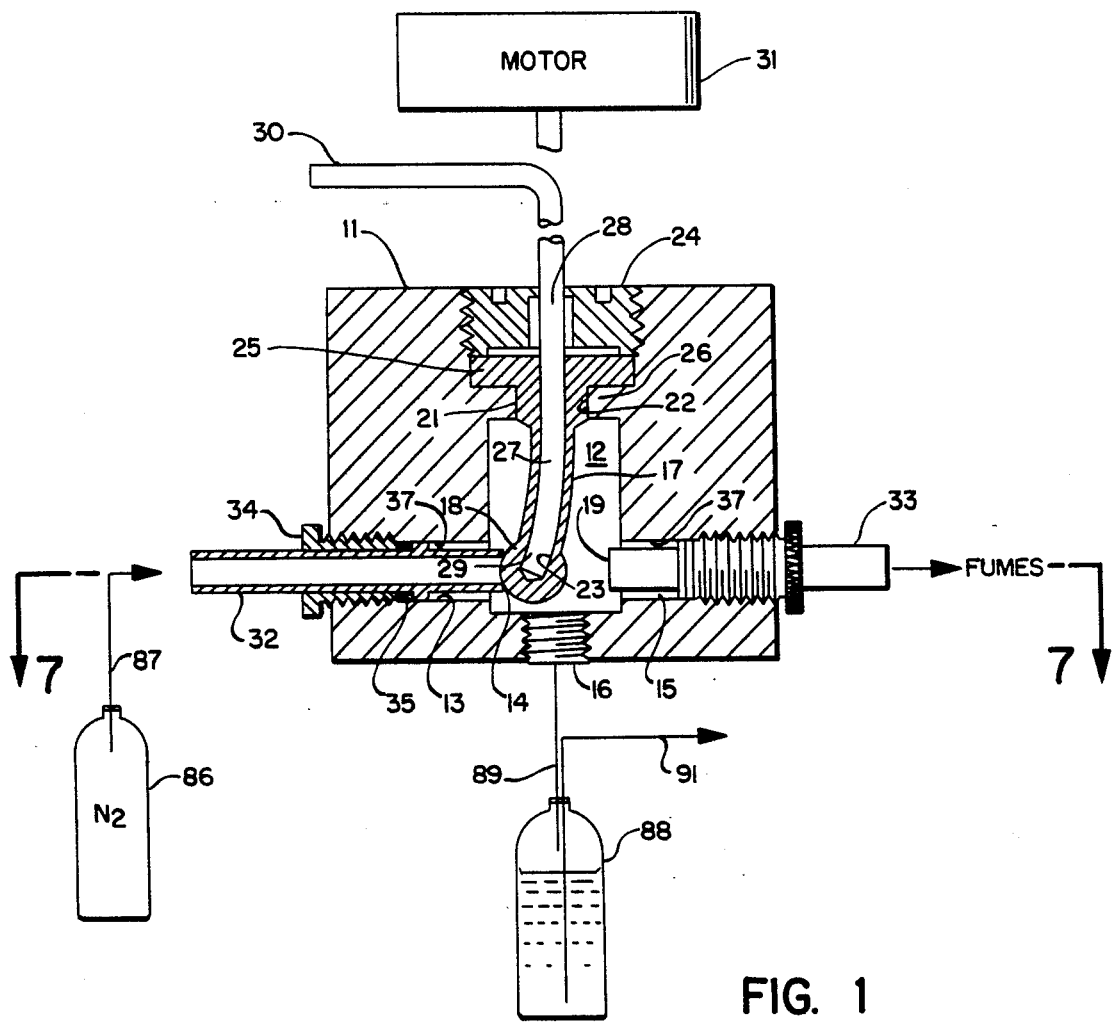
FIG. 1 is a cross-sectional view of an embodiment of the invention illustrating a chemically resistant diverting valve and shown somewhat schematically connected in a process chemical system required to handle fluids which are highly corrosive or chemically active.

In the embodiment of the invention illustrated in FIG. 1 there is a valve body 11 formed with a chamber 12. One or more peripheral passageways 13 are provided in the valve body 11 around the chamber 12 providing valve ports at the inner ends thereof, at least one of which has a valve seat 14 therein. There is at least one additional valve port to cooperate with the valve seat 14 in forming a fluid flow passageway. For example, there may be an additional peripherally located passageway 15, or a port 16 located elsewhere in the valve body 11.

There is a flexible stem or finger 17 extending into the chamber 12 and having on the end thereof a valve closure member referred to for convenience as a "ball" 18 a sweeping assembly 4 and mounting 5, a litter suction pick-up device 6 and a debris storage container 7.

Figure 2:
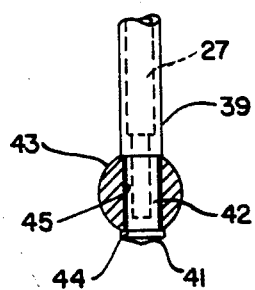
FIG. 2 is a fragmentary diagram of a modification of the "ball" of FIG. 1 in which a valve ball is employed which is mounted rotatably at the end of a closed-end, hollow stem instead of being an integral part of the stem.
Figure 3:
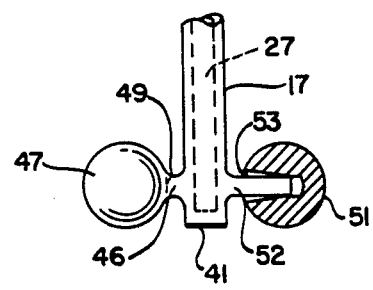
FIG. 3 is a fragmentary diagram of a further modification in which a pair of valve "balls" are carried at the end of the flexible stem.

Sweeping assembly 4 and mounting 5 are shown in FIG. 1 in a fully lowered operating position to sweep material into pick-up device 6 for transfer to and storage in container 7; and are shown in FIGS. 2 and 3 in their raised retracted position.

As best shown in the latter two drawing figures, assembly 4 comprises a rotary so-called gutter brush 8 which is rotatably driven about a generally vertical axis 9 by any suitable well-known means, not shown. A drive housing 10 extends upwardly from brush 8, and has a bracket 11 disposed at its upper end.

A vertical shaft 12 defining an axis 13 is suitably fixedly mounted to frame 2 forwardly of assembly 4. Dual pairs of vertically spaced parallel connector rods 14 are connected to a shaft swivel 15 at their forward ends, as on horizontal pivot axes 16, and extend rearwardly for connection to bracket 11, as on horizontal pivot axes 17. Rods 14 and their pivotal end connections provide a linkage means mounting brush 8 for movement together in a vertical direction.

The brush is also mounted for controlled movement in a horizontal or swing direction. For this purpose, a connector means 18 is connected at its forward end to a universal joint 19 having a generally vertical axis 19a and mounted on a bracket 20 fixedly secured to frame 2 forwardly of shaft 12. The connector means 18 extends rearwardly past shaft 12 and terminates at its rearward end in a second universal joint 21 having a generally vertical axis 21a and mounted on bracket 11.

The elements 12-21 comprise the aforementioned mounting 5.

For purposes of positioning brush 8 between retracted and operative positions, a motive means such as an hydraulic ram 22 is connected at its forward end to swivel 15, as on a horizontal pivot axis 23 disposed above axes 16, and extends rearwardly for connection to a lower connector rod 14, as on horizontal axis 24. Ram 22 may be actuated through hydraulic lines 25 by any suitable control means, not shown, preferably located in cab 3. Extension and retraction of the ram will cause a compound three-dimensional re-positioning of brush 8, with movement thereof involving both vertical and horizontal directional components as dictated by the interconnections of the elements of mounting 5.

Figure 4:
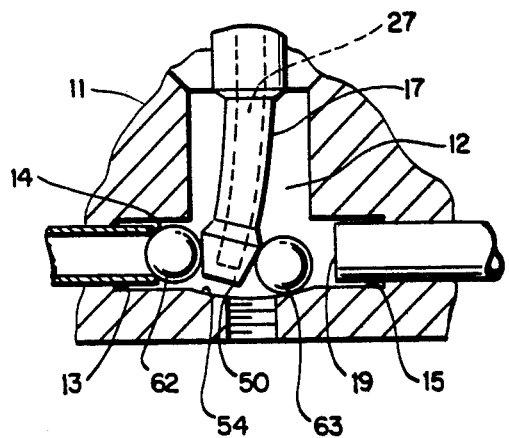
FIG. 4 is a fragmentary diagram of a further modification in which movable, confined valve balls are provided which are not connected to the flexible stem or finger but are arranged to have their movement controlled by an actuator at the end of the stem.

The retracted or travel position of brush 8 and its associated elements, with the brush completely inboard, is not only shown in FIGS. 2 and 3, but is also shown in the schematic top plan view of the vehicle shown in FIG. 4.

Figure 11:
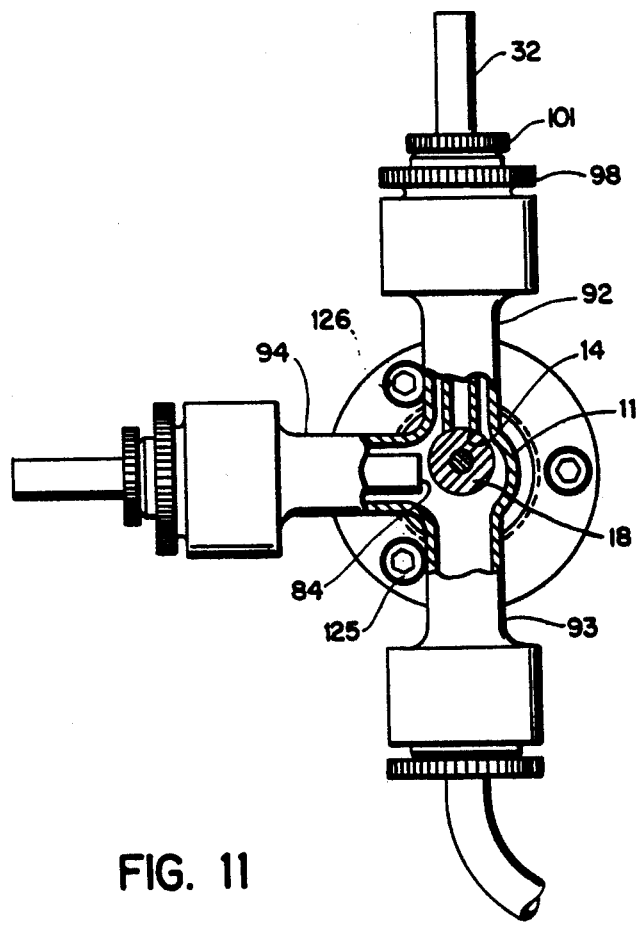
FIG. 11 is an end view partially in cross section of the embodiment of FIG. 10.
Figure 12:
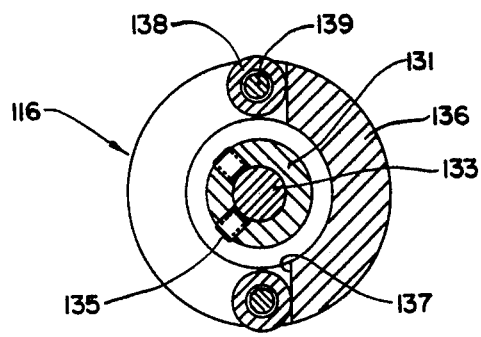
FIG. 12 is a view of a cross section of the embodiment of FIG. 10 represented as cut by a plane 12—12 indicated in FIG. 10.

During normal operation of sweeper 1, ram 22 is actuated to swing brush 8 outwardly and downwardly from its retracted position until it engages the street surface 26 and, if desired, sweep against a curb 27; with the position of brush 8 being such as to be in overlapped relationship between the vehicle body perimeter 28 and the street. Thus, brush 8 would be partly inboard and partly outboard of perimeter 28 during sweeping operations. This normal lowered position is shown schematically in FIG. 10, wherein the perimeter 28 of sweeper 1 is spaced inwardly from curb 27. This is possible when a wide street is being swept. FIGS. 11-13 illustrate the parts in detail when the brush is so lowered. It is to be noted that connector means 18 retains the same length, and thus the radius of horizontal swing component remains the same in shifting from the retracted position of FIGS. 2-4 to the lowered position of FIGS. 10-13.

It has been found that in some instances the normal sweeping position of brush 8 may not be suitable, such as when sweeper 1 is to travel along a very narrow street and sweep a curb. In such a situation, and for maximum sweeping efficiency, when brush 8 is in its lowered operating position, it should be positioned substantially completely inboard of the vehicle perimeter 28, as shown schematically in FIG. 14, with the perimeter 28 and curb line 27 substantially coinciding.

In other instances, it has been found that it is sometimes desirable to sweep a horizontal ledge 29, which extends along the side of the street, especially on bridges, with the ledge being raised from the level of the street. In this case, brush 8 must sweep completely outboard of the sweeper perimeter 28, as schematically shown in FIG. 19. Furthermore, the brush must be able to sweep efficiently at a higher level than the street.

It has been discovered that the above variations from the normal brush operating position can be accomplished by constructing the connecting means 18 so that it is selectively variable in length along its axis to thereby vary the radius of horizontal swing component. For this purpose, and referring first to FIGS. 5-8, means 18 comprises an elongated tie rod element 30 having a longitudinal axis 31 having a length corresponding to the radius of horizontal swing component.

Element 30 is adapted to be of fixed length during extension and retraction of brush 8, and during the sweeping operation, but is adapted to be selectively adjustable (along with the said radius) to change the swing geometry to accomplish the desired multi-purposing of the operating brush.

For this purpose, and in the present embodiment, element 30 comprises a tri-part assembly including a forward sleeve 32 connected at its front end to universal joint 19, a rearward sleeve 33 connected at its rear end to universal joint 21, and a central shaft 34. The ends of shaft 34 are telescopingly received within sleeves 32 and 33 and joins them to create the complete element 30.

The forward end of shaft 34 normally extends within sleeve 32 to adjacent joint 19, and a releasable locking pin 35 extends through aligned openings 36 in the members to hold them in fixed relationship. See FIG. 8. The rearward end of shaft 34 normally extends within sleeve 33 to a position substantially spaced from joint 21. A suitable lever mechanism 37 joins shaft 34 to sleeve 33.

The showing of the tie rod element of FIGS. 5-8 is the same as that shown in FIGS. 2, 3 and 11, 12. The fixed positional length of the connector is such that upon extension of ram 22, brush 8 will overlap the vehicle, as also shown in FIG. 4.

As previously pointed out, it is sometimes desirable to move brush 8 to an operating position wholly inboard of the vehicle, as shown in FIG. 14. Referring to FIGS. 15-18, this is accomplished by lengthening axis 31 (and the said radius) from the normal. Pin 35 is removed from openings 36 and placed in a retaining opening 38 in a bracket 39 slidable on sleeve 32. See FIG. 9. When ram 22 is actuated, shaft 34 will telescope outwardly until bolts 40 on shaft 34 and bracket 39 engages adjustable stop screws 41 on sleeve 32. With continued movement of ram 22, element 30, which now has an effectively fixed length providing a longer axis 31, will permit swinging compound drop-down movement of brush 8 to the inboard operating position shown in FIGS. 14 and 18.

Another embodiment, well adapted for use in two-way or diverter valves, is illustrated fragmentarily in FIG. 4 in which loose valve balls 62 and 63 are provided, which are not connected to the flexible stem 17, but engageable by the lower end thereof. In this embodiment the flexible stem 17 is formed with a closed lower end in truncated conical form to serve as a ball actuator 50. The valve seats 14 and 19 are also set far enough radially outward in the ports 13 and 15 to provide guideways or passageways in the ports for guiding the balls 62 or 63 when the ball actuator 50 is moved against it.

Moreover, the valve is mounted in such a way that the axis of rotation of the operating shank 28 of the operating rod 27 will be vertical with the ball actuator 50 downward, and the chamber 12 in the valve body 11 is shaped with a dished lower surface 54 so located with respect to the valve ball actuator 50 that the valve ball, in this case the valve ball 63, which is not seated against its valve seat 19, rolls downward while remaining in contact with the valve ball actuator 50 so that, as the valve stem 17 is deflected from the position shown in FIG. 4, the actuator 50 will remain in contact with the second ball 62 and move it into engagement with the valve seat 14.

Figure 5:
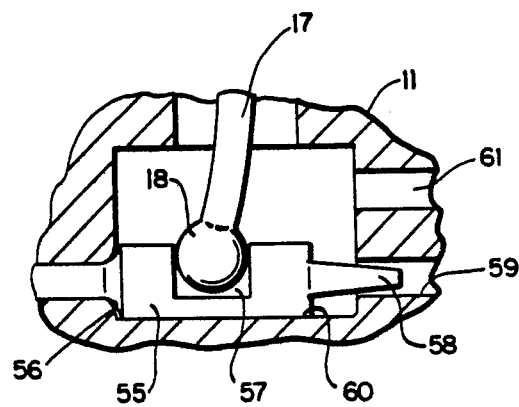
FIG. 5 is a fragmentary longitudinal sectional view of still another embodiment of the invention in which a sliding valve member is provided to act alternately as a closing valve for one port or a throttling valve for another port, and the position of the sliding valve member is controlled by the position of the end of the flexible stem.

A further modification for use as a diverter valve is fragmentarily illustrated in FIG. 5 in which a slider 55, in place of a valve ball or pair of valve balls, is employed for closing a valve port 56 suitably formed to provide a valve seat. Preferably the slider 55 is formed with a notch 57 adapted to receive the lower end of the deflecting flexible stem 17, preferably in spherical form.

FIG. 5 also illustrates a form of the invention arranged to act as a throttling valve. The slider 55 has a tapered end 58 adapted to be received to a greater or less extent in a valve port 59 according to the angular position of the bent operating rod 27 for throttling flow through the port 59 as the port 56 is opened by movement of the slider 55 toward the right. If desired, an additional passageway 61 may be provided which receives flow from or to the port 56 which is not under control of the throttling valve 58–59. The valve body 11 is formed with a suitable groove 60 or guideway for receiving and guiding the slider 55.

Figure 7:
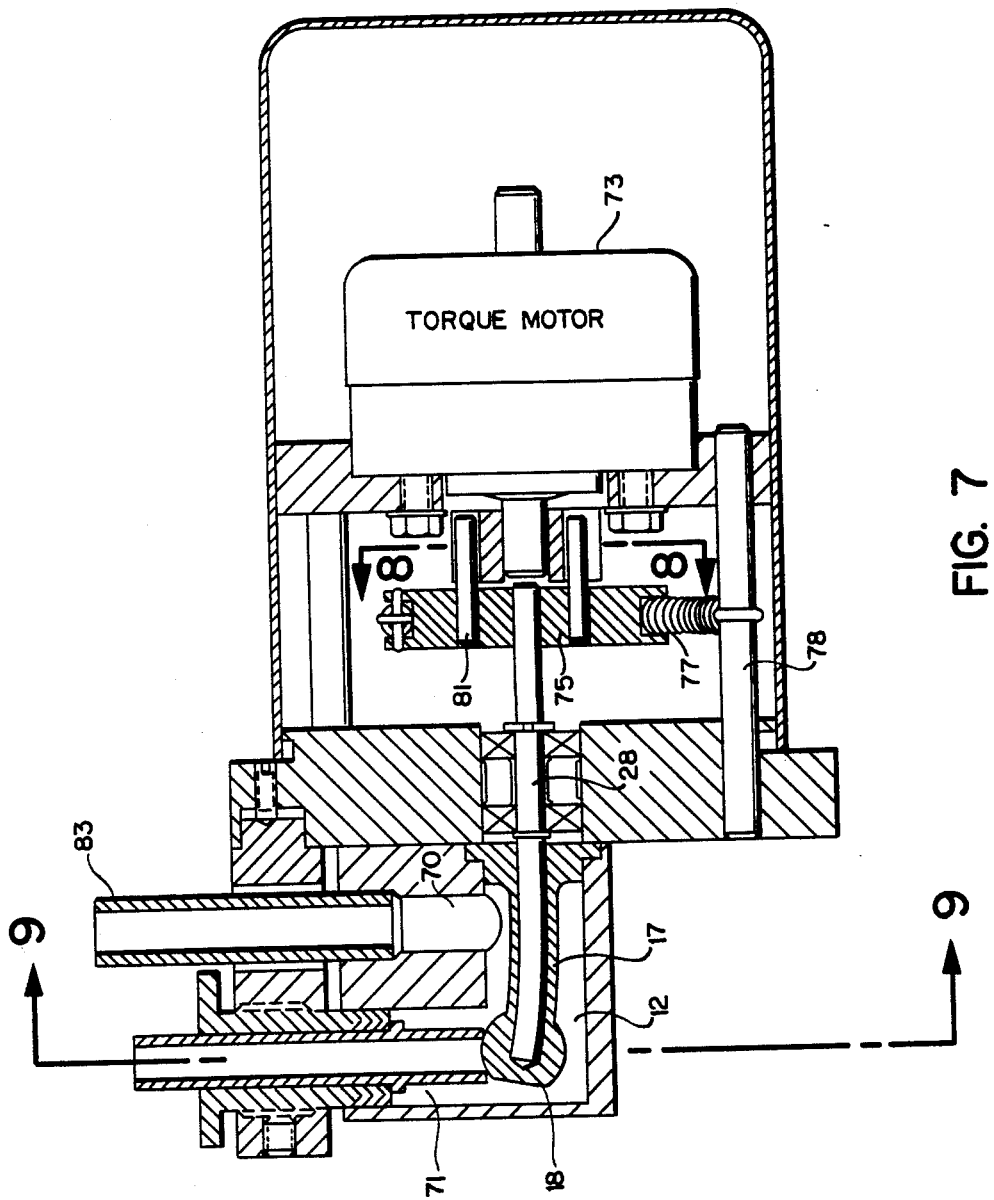
FIG. 7 is a cross section taken along a longitudinal plane through the axis of rotation of the operating rod illustrating another embodiment of the invention in which the ports are arranged at an angle of the order of 75°, and in which an additional port is provided but axially spaced from the other ports with respect to the axis of rotation of the operating rod.
Figure 8:
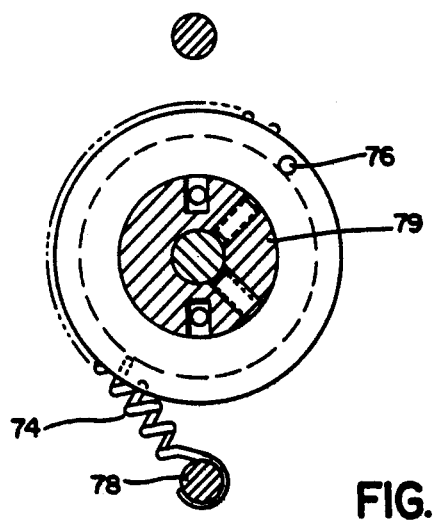
FIG. 8 is a view of a section of the arrangement of FIG. 7 cut by a plane 8—8 intersecting the clutch connector for a driving motor and the operating rod to illustrate the manner of causing the valve "ball" to move back and forth between two relatively closely spaced valve seats.
Figure 9:
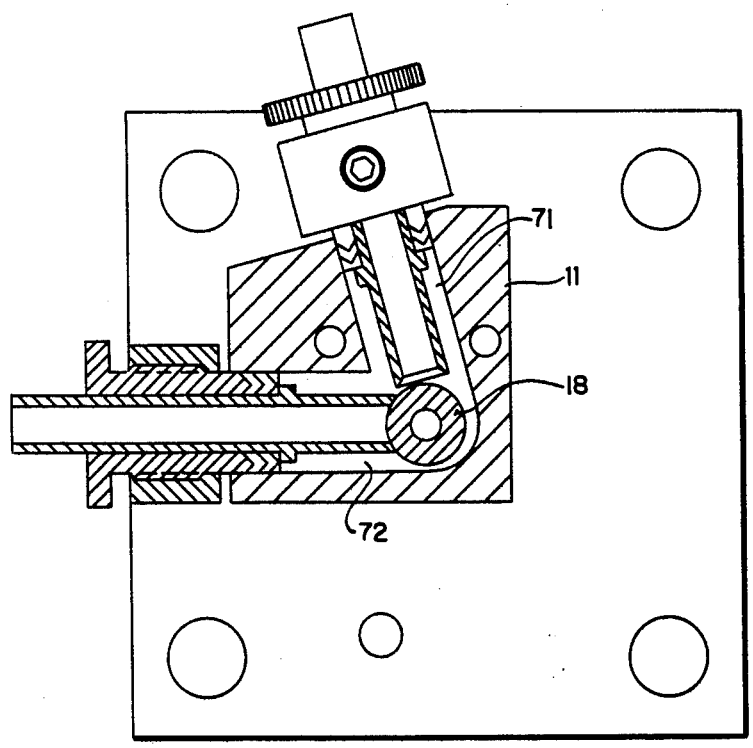
FIG. 9 is a view of a section of the embodiment of FIGS. 7 and 8 represented as cut by a plane through the axes of the peripheral valve ports represented as plane 9—9 in FIG. 7.

A construction which provides a particularly quick action in a diverter valve is illustrated in FIGS. 7, 8 and 9. As shown in FIG. 9, the valve body 11 is formed with only two ports 71 and 72 having axes that are at a relatively small angle to each other, for example about 75° as shown, so that very short movement is required of the valve ball 18 in shifting from engagement with the valve seat of one port to that of the other. Moreover, the valve ball actuation mechanism is such that the valve ball 18 shifts back and forth between the ports 71 and 72. This is accomplished by providing a rotary solenoid 73 (see FIG. 7) to rotate the shank 28 of the bent rod actuator 27 in one direction and a spring 74 (see FIG. 8) to return it to its original position. A sheave 75 is mounted on the shank 28 of the operating rod. The spring 74 is secured at one end to the sheave 75 by means of a pin 76 bridging a groove 77 in which the spring 74 is mounted. Its opposite end is secured to a stationary pin 78. The solenoid 73 in turn is engaged with the sheave 75 by means of a slotted disc 79 on the motor shaft and pins 81 extending in an axial direction from the sheave 75.

As best seen in FIG. 7, a third port 70 for the valve is provided which communicates with the chamber 12 in the valve body at a location spaced axially from the ports 71 and 72 with respect to the shank 28 of the operating rod.

The mode of operation of the embodiments of the valve will be apparent from the illustrated construction. For example, when the embodiment of FIG. 1 is employed for two-way operation as a diverter valve such as is required for controlling the delivery of reagents from their containers into the metering vessel of a synthesizer system, the port 16 is connected to a pressurizing line 89 of a reagent supply container 88. The connector 32 is connected to a supply of low pressure nitrogen in a tank 86 through a pipe 87. The nitrogen supply may be at a low pressure of approximately five pounds per square inch gauge, for example. The connector 33 is joined through suitable piping (not shown) to a vent for fume disposal. In the synthesizer system, the valve is provided with a suitable actuator such as a solenoid air cylinder or other suitable actuator such as the motor 31. When the synthesizer controller calls for reagent, the motor 31 rotates the operating rod 17 to open the port at the seat 14 and close the port at the seat 13, pressurizing the reagent container 88 and forcing reagent through a line 61 into a metering vessel (not shown). Upon a signal from a level sensor (not shown) on the metering vessel, the valve actuator 31 rotates the operating rod 17 to close the port at the seat 14 and opening the port at the seat 19, thereby venting pressure from the reagent container 88 and stopping the flow of reagent into the metering vessel through the line 61.

The nitrogen venting through the connector 33 may carry with it a rather significant amount of solvent vapors and in some instances highly corrosive acid fumes. These vapors or fumes cannot affect the working parts of the apparatus since the rotatable operating rod 17 is wholly enclosed by the hollow stem 17 and the actuator or motor 31 is outside the valve body which is sealed between the inward face of collar 15 and shoulder 16. The construction is such that the parts exposed to such vapors or fumes may be composed of material which is resistant thereto, such as glass, ceramic or Kel-F material in the case of the valve body 11, and resilient but chemically resistant material such as polytetrafluoroethylene in the case of the valve seats 14 and 19, the hollow flexible stem 17 and if desired the valve ball 18. The valve ball may be composed of rigid material if the valve seats are somewhat resilient.

Figure 6:
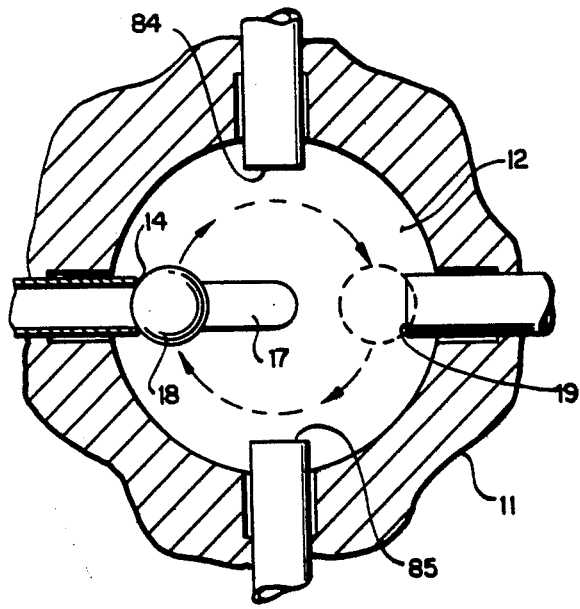
FIG. 6 is a fragmentary view of a cross section of an embodiment in which a plurality of valve body openings and ports are peripherally spaced around the axis of rotation of the operating rod shank with the ports shown spaced 90° from each other.

Although embodiments of the invention have been illustrated in which a port without a valve seat is employed in conjunction with two ports with valve seats to form a diverter valve or two-way valve, the invention is not limited thereto and the construction of the invention is well adapted also to arrangements having a plurality of seats peripherally arranged as illustrated in FIG. 6. Since the valve ball 18, secured to the lower end of the flexible stem 17, travels in a circular or orbital path, it moves successively into engagement with valve seats arranged peripherally as the operating rod 27 is rotated. In the arrangement of FIG. 6, opposite valve seats 14 and 19 are shown, together with two additional valve seats 84 and 85 spaced 90° from the valve seats 14 and 19. However, there may be a greater or less number of ports and corresponding valve seats spaced around the periphery of the chamber 12 in the valve body.

Figure 10:
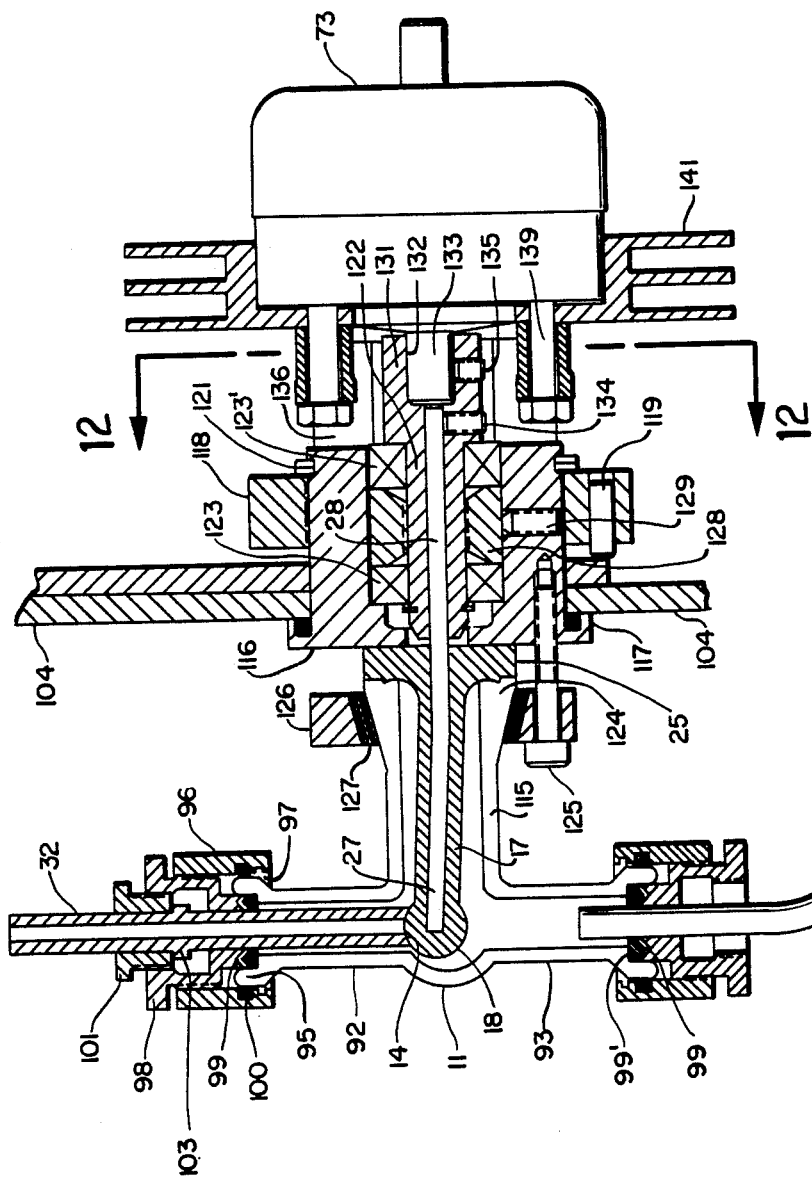
FIG. 10 is a sectional view of the preferred embodiment of the invention having a glass valve body useful for handling very active or corrosive reagents.

In the embodiment of FIGS. 10, 11 and 12, which is the preferred embodiment of the invention, the valve body 11 is composed of glass with integral radiating tubular arms 92, 93 and 94 in which piping or tubing connectors such as the connector 32 are mounted. Each tubular arm, such as the arm 92, is provided with a flanged end portion 95 of suitable shape to make a sealed connection with the connector 32. As illustrated, connecting fittings are provided, including a bushing 96 which is cemented to the outside of flange 95. Cement 97, of the liquid epoxy type, is retained during manufacture by the O-ring 100. A hollow screw 98, acting upon a Chevron seal 99, seals the space between the connector 32 and end 95 of the arm 92. A second hollow screw 101 cooperating with a shoulder 103 formed on the connector 32 provide means for adjusting and supporting valve seat 14 against the ball end of flexible stem 17.

The tubular arms 92, 93 and 94 of the valve body 11 are of sufficient diameter to provide adequate clearance for flexing connectors 32 which are composed of resilient material with relatively long inner ends so that the inner ends may flex enough to engage and follow the valve ball 18 for a short extent as it closes and opens against the valve seats 14 and 84.

Support for a tubular arm 115 of the valve body 11 surrounding the flexible valve stem 17 is provided by a fitting 116 secured in a suitable opening in the plate 104 forming a part of the instrument or panel with which the valve is employed. The fitting 116 is secured in the plate 104 by means of a gasketed flange 117 on one side of the plate 104 and a ring 118 on the other side of the plate 104 with a series of screws 119 (only one of which is visible in the sectional view of FIG. 10) bearing in the direction of the plate 104. The ring 118 is secured against axial movement on the fitting 116 by means of a two-turn snap ring 121 in suitable grooves in the member 116.

The tubular arm 115 of the valve body 11 is formed with a base 124 having an outer surface sloping outward toward the base. The base 124 is secured against the collar 25 of the valve stem 17, and the collar 25 in turn is secured against the fitting 116 by means of bolts 125 passing through a ring 126 and threaded into the fitting 116. The ring 126 has a conical inner surface fitted with a gasket 127 to avoid straining the valve body 11 at the base 124.

A ring 128 of larger internal diameter than the hollow shaft 122 is provided for spacing the bearings 123 and 123' and is secured by a set screw 129. The hollow shaft 122 is formed with a larger diameter portion 131 to form a shoulder for retaining the right-hand bearing 123' and to provide an increased internal diameter portion 132 for receiving the shaft 133 of the rotational solenoid 73. The straight shank 28 of the bent operating rod 27 and the solenoid shaft 133 are secured in the hollow shaft 122 by means of set screws 134 and 135, respectively.

For rotating the straight shank 28 of the bent operating rod 27, the shank 28 is mounted within a hollow shaft 122 journaled in the member 116 by means of bearings 123 and 123'.

As shown in FIG. 12, the fitting 116 has an axially extending portion 136 slightly more than a lateral half of which is cut away along chordal surfaces 137 to provide surfaces against which bushings 138 may rest to prevent rotation of the body of the rotational solenoid 73. The bushings 138 are mounted upon threaded studs 139 extending from the base of the rotational solenoid 73. As illustrated, the rotational solenoid 73 is provided with cooling fins 141.

It is apparent that the valve of the present invention permits its use in a chemically corrosive atmosphere by virtue of its design. The valve actuator and driving mechanism are well isolated from the corrosive materials by a new and improved use of flexible, chemically resistant materials. Although particular components, structure and form have been discussed in connection with specific embodiments, others may be utilized. Furthermore, it will be understood that although exemplary embodiments of the invention have been disclosed and discussed, other applications and mechanical arrangements are possible and that the embodiments disclosed may be subjected to various changes, modifications and substitutions without necessarily departing from the invention.

What is claimed is:

1. A valve comprising in combination:
   a valve body having a chamber with surrounding walls formed with fluid-conveying openings through the walls into the chamber,
   an elongated resilient connector mounted in at least one of said openings, one end of said connector extending into said chamber to form a movable valve seat, said one end of said connector being unsupported in a lateral direction with respect to the longitudinal axis of said connector,
   a valve member for cooperation with the valve seat, movable in an arcuate path into and out of engagement with the valve seat, said valve member being slightly recessed within said valve seat when in engagement with said valve seat,
   a flexible stem mounted in one of said walls and having an inner end extending into said chamber, the stem being of sufficient flexibility to permit deflection of the inner end, and
   means for deflecting the inner end of the stem, the inner end being in operative relationship with the valve member, whereby deflection of the inner end of the stem moves the valve member into or out of engagement with the valve seat, said one end of said connector with said valve seat movable within said chamber to allow said valve seat to shift as a unit laterally to engage and follow said valve member in a sealed relation to ensure a satisfactory seal between said valve member and said valve seat as said valve member moves in said arcuate path to engage said valve seat.

2. A valve as defined in claim 1 wherein the valve body is comprised of a chemically resistant material with a chemically resistant material at the valve seats, the flexible stem is composed of a chemically resistant material, the valve member is composed of a chemically resistant material and is sealingly joined to the flexible valve stem.

3. A valve as defined in claim 1 wherein the connector seat faces toward the chamber in the body and the end of the connector having the seat is of smaller diameter than the opening to provide a clearance, and the connector is composed of resilient material free to move laterally in said clearance, permitting the seat to locate against the ball without over constraint.

4. A valve as defined in claim 1 wherein the valve stem is secured against rotation but provided with means for causing the end thereof to travel in an arcuate path.

5. The valve defined in claim 1 wherein the valve member has a spherical surface and the valve seat has a surface conforming to the surface of the valve member.

6. The valve defined in claim 5 in which the valve member constitutes a valve ball secured to the inner end of the valve stem.

7. The valve defined in claim 6 wherein the valve ball is integral with the valve stem.

8. The valve defined in claim 1 wherein the valve stem is hollow with a bore closed at the inner end and the means for deflecting the inner end of the valve stem comprises a rod extending through said hollow bore toward the inner end thereof.

9. The valve defined in claim 8 wherein the rod is bent having a straight portion rotatable coaxially with the valve stem opening in the valve body, and having an inner end eccentric with respect to the axis of the straight portion whereby the inner end of the valve stem is deflected by rotation of the rod.

10. A valve comprising:
a valve body having a central chamber;
at least two ports radiating from said chamber with axes substantially in a plane;
an elongated resilient connector member secured adjacent its outer end in at least one of said ports, said connector having its inner end extending into said chamber and being unsupported and free to flex within said chamber in a lateral direction with respect to the longitudinal axis of said connector;
a valve seat formed on the inner end of said resilient connector;
a valve member movable into and out of engagement with said valve seat; and
a valve stem secured in said valve body against rotation, having an end extending into the chamber transversely to said plane with means for causing orbital motion of said extending end, said extending end being in operative relation to said valve member to move said valve member into and out of engagement with said valve seat as the valve stem travels in its orbital path, said valve seat free to flex into and out of engagement with said valve member as said valve stem end travels in its arcuate path, said valve seat being movable as a unit within said chamber in response to said movement of said valve member to enhance the sealed relation between said valve member and said valve seat.

* * * * *

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

Columns 3 and 4 pertain to another patent and should be deleted in their entirety. The following should be inserted:

--which moves into or out of engagement with the valve seat 14 and any additional peripherally spaced valve seats such as a valve seat 19. The flexible stem 17 has an upper or outer end with a collar 21 secured in an opening 22 in the valve body. The flexible stem 17 is hollow, the hollow interior being closed at the lower or inner end 23 so that fluid entering the chamber 12 cannot enter the interior of the valve stem 17. Moreover, the stem collar 21 is sealed in the valve body opening 22 to prevent fluid from the chamber 12 entering the upper end of the stem 17 or reaching operating mechanism of the valve.

The stem 17 is retained within the seat 22 by means of a hollow sealing screw 24 pressing an enlargement 25 of the stem collar 21 against a shoulder 26 in the valve body 11. In addition, the pressure of the screw 24 against the enlargement

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

25 prevents rotation of the stem 17. The stem 17 is composed of a material which is sufficiently flexible so that the valve ball 18 may be deflected into and out of engagement with the valve seat 14 and the valve seat 19.

For actuation of the valve ball 18 a valve operating rod 27 is provided having a straight portion or shank 28 rotatable in the stem collar 21 and having a lower or inner end 29 which is eccentric, being bent out of alignment with the shank 28 so that rotation of the straight shank 28 causes orbital or circular motion of the lower end 29 of the bent operating rod 27. The portion of the rod 27 from the straight portion 28 to the end 29 is preferably bent along a curve, as shown. The orbital motion of the lower end 29 of the rod 27 causes orbital motion of the end of the stem and the ball 18, thereby causing it to move into and out of engagement with

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

successive peripherally spaced valve seats 14 and 19, thus successively closing and opening the ports of such valve seats.

For manual operation of the valve and rotation of the operating rod shank 28, a transversely projecting handle 30 may be provided. Alternatively, for automatic or remote operation a motor 31 may be provided.

As already explained, the lower end 23 of the interior of the stem 17 is closed. This is accomplished in the embodiment of Fig. 1 by making the valve ball 18 an integral part of the stem 17 and of the same composition as the valve stem 17 and extending the valve ball 18 around the end 29 of the bent operating rod 27.

For closing the passageways 13 and 15 and making connections with fluid-conveying tubing or the like, the connectors 32 and 33 may be provided which, as shown, are formed to provide the valve seats 14 and 19 at the inner ends thereof.

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

For sealing the connectors 32 and 33, hollow screws 34 are provided cooperating with Chevron seals 35.

Necessarily, the passageway bores 37 are of greater diameter than the outer diameter of the inner ends of the connectors 32 and 33 so as to provide clearances in the passageways 13 and 15. The connectors 32 and 33 are composed of material of sufficient resiliency to permit them to flex enough to engage and follow the ball 18 for a short distance as it closes and opens against the seats. Consequently, the valve seats 14 and 19 seat well against the spherical surface of the valve ball 18 when the valve ball 18 is brought into engagement with a valve seat.

The flexible stem 17 is also composed of relatively resilient material in order that the stem 17 may be deflected by the rotation of the bent operating rod 27. Moreover, the connectors and the valve stem are preferably composed of a

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

material which is also resistant to corrosive or reactive chemicals or fluids. A suitable material has been found to be a polymer such as polytetrafluoroethylene sold by the duPont de Nemours Company under the trademark "Teflon".

Although the construction permits the use of a very rigid brittle material such as glass or ceramic for the valve body 11, the use of such material is not mandatory and a non-brittle and slightly resilient but relatively rigid, self-supporting material may also be employed which is relatively stable chemically. For instance, a fluorcarbon product such as a polymer of chlorotrifluoroethylene elastomer such as that sold by the Minnesota Mining Company under the trade name Kel-F may be employed. Moreover, it is not mandatory that both the valve seats 14 and 19 and the valve ball 18 be composed of the same resilient material. For example, the valve ball 18 may be composed of a rigid material such as glass cooperating with

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

resilient valve seats on connectors such as the connector 32 having inner ends capable of flexing to enable the glass ball to find a seat.

If the ball 18 is composed of a rigid material such as glass or ceramic, or a substance such as the Kel-F material, it is attached to the stem 17 in such a manner as to form a fluid tight joint or, if it is loosely mounted, the lower end of the stem 17, independently of the ball 18, is extended beyond the lower end of the hollow interior 23 for fully enclosing the operating rod 27 at its lower end 29 to protect it against attack by the fluids entering the chamber 12.

For example, as illustrated in Fig. 2, a stem 39 may be employed which has a closed lower end 41 adjacent a slightly reduced diameter end portion 42 adapted to receive a ball 43 and having a ball retainer ring 44 secured to the valve stem end 41 in any suitable manner. Although the ball 43 may be

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

fixed upon the reduced diameter end 42 of the valve stem 39, the arrangement also permits rotatable mounting of the ball 43 by providing the ball with an opening 45 having an internal diameter slightly greater than the external diameter of the reduced end portion 42 of the valve stem 39. This construction permits the use of plastic material such as the Kel-F polymer for the ball 43 or more rigid, brittle material such as glass or ceramic.

Another modified embodiment which permits the use of either rigidly mounted or rotatably mounted ball valves is illustrated in Fig. 3. The embodiment of Fig. 3 is particularly adapted to a two-way or diverter valve of the type illustrated in Fig. 1 having valve seats which are alternatively closed and opened. In the embodiment of Fig. 3, the flexible stem 17 may have a lateral arm 46 carrying a valve ball 47 which may be composed of the same material as the valve stem 17 and integral

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above-identified patent and that said Letters Patent are hereby corrected as shown below:

therewith. It is also possible to attach a ball composed of another material such as Kel-F polymer or a brittle material, such as glass or ceramic, which may be attached in the manner disclosed by the right-hand ball 51 of Fig. 3. Although the valve ball 51 may be rigidly mounted upon the arm 52, the construction permits also providing a pivotal joint or even a rotatable joint between the valve ball 51 and the arm 52 to permit quicker seating engagement between the valve ball 51 and its corresponding valve seat. As shown in Fig. 3, the valve ball 51 is formed with a socket 53 adapted to snap over the end of the lateral arm 52. It will be understood that,

UNITED STATES PATENT AND TRADEMARK OFFICE
CERTIFICATE OF CORRECTION

PATENT NO. : 4,085,952
DATED : April 25, 1978
INVENTOR(S) : Thomas D. Sharples

It is certified that error appears in the above—identified patent and that said Letters Patent are hereby corrected as shown below:

if desired, both valve balls may be mounted in the manner of the valve ball 51 or the ball 47 in the embodiment of Fig. 3.--

Signed and Sealed this

Twenty-sixth Day of December 1978

[SEAL]

Attest:

RUTH C. MASON
*Attesting Officer*

DONALD W. BANNER
*Commissioner of Patents and Trademarks*